United States Patent [19]

Eckert et al.

[11] 4,338,537

[45] Jul. 6, 1982

[54] SYNCHRONOUS TURBINE TYPE ELECTRIC MOTOR

[75] Inventors: Joachim Eckert; Franz Spirk, both of Berlin, Fed. Rep. of Germany

[73] Assignee: Siemens Aktiengesellschaft, Munich, Fed. Rep. of Germany

[21] Appl. No.: 937,200

[22] Filed: Aug. 28, 1978

[30] Foreign Application Priority Data

Sep. 12, 1977 [DE] Fed. Rep. of Germany ....... 2741362

[51] Int. Cl.³ .............................................. H02K 3/48
[52] U.S. Cl. ..................................... 310/214; 310/45; 310/197; 310/269
[58] Field of Search ............... 310/177, 179, 181, 182, 310/269, 183, 45, 58, 59, 61, 64, 65, 262, 265, 264, 194, 214, 215, 270, 162, 197

[56] References Cited

U.S. PATENT DOCUMENTS

| | | | |
|---|---|---|---|
| 1,261,673 | 4/1918 | Alexanderson | 310/262 |
| 1,913,264 | 7/1933 | Cornu | 310/262 |
| 2,575,932 | 11/1951 | Taylor | 310/262 |
| 2,745,030 | 5/1956 | Baldwin | 310/214 |
| 3,009,073 | 11/1951 | Drabik | 310/214 |
| 3,683,220 | 8/1972 | Konovalov | 310/183 |
| 3,870,912 | 3/1975 | Kipke | 310/183 |
| 4,152,610 | 5/1979 | Wallenstein | 310/214 |

*Primary Examiner*—R. Skudy
*Attorney, Agent, or Firm*—Kenyon & Kenyon

[57] ABSTRACT

A turbine type synchronous motor capable of starting directly and asynchronously when coupled to a work-performing machine is constructed with a drum rotor of high mass, made of solid magnetic material containing iron, and having no damper winding. The field windings, short-circuited or closed through a resistance during starting, are radially disposed in insulated slots which are closed by insulated wedges wherein the insulation is of highly temperature resistant material.

2 Claims, 3 Drawing Figures

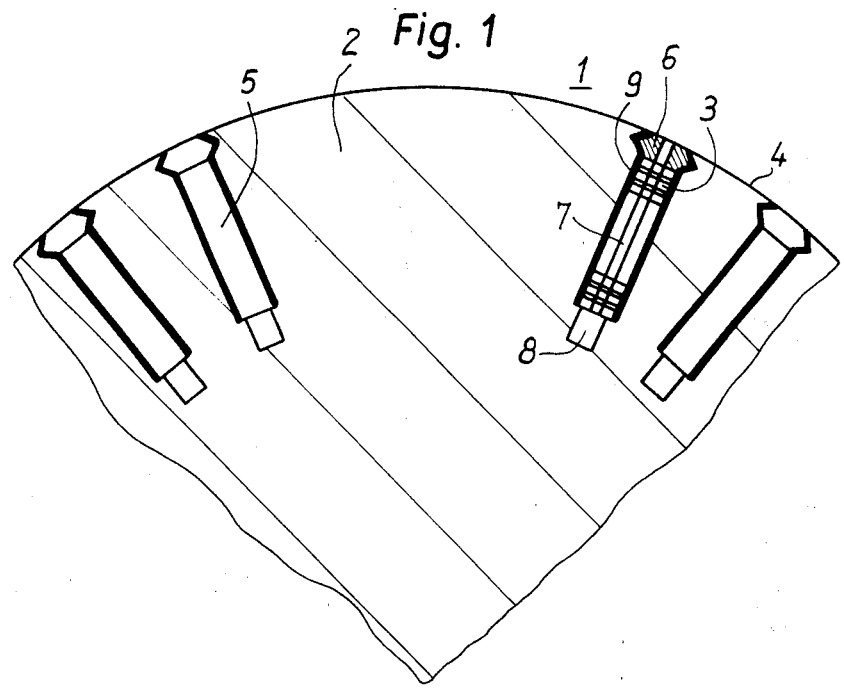
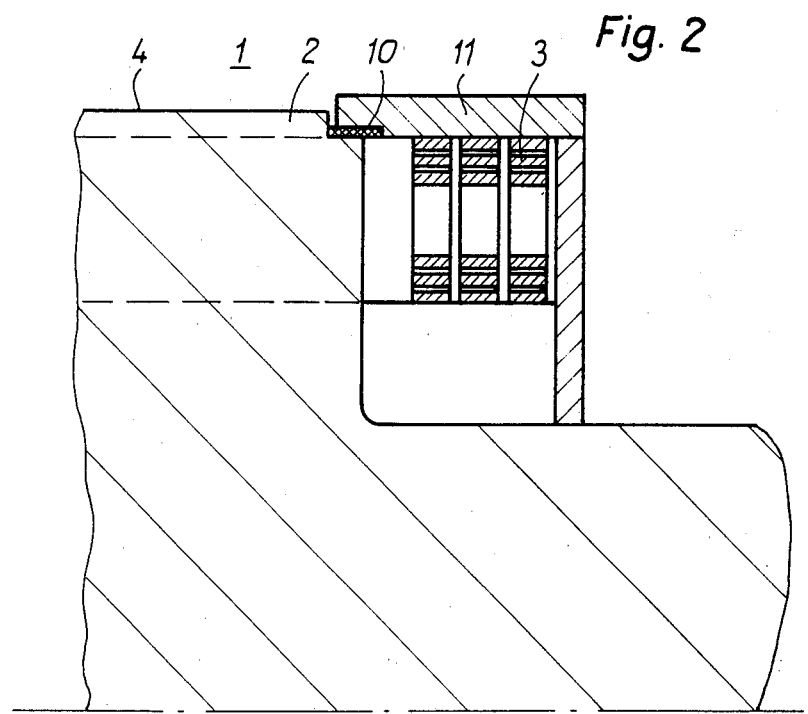

SYNCHRONOUS TURBINE TYPE ELECTRIC MOTOR

BACKGROUND OF THE INVENTION

This invention relates to a synchronous turbine type electric motor. A turbine type electric motor is an alternating current machine designed for high speed operation and having an excitation winding imbedded in slots in a cylindrical steel rotor made from forgings or thin disks. The motor has a stator and a rotor, with the rotor having a large mass of solid iron or iron alloy.

In a synchronous motor there are usually two sets of windings. One of the sets of windings is in the stator, and these windings provides the revolving field that is needed to drive the rotor. The second set of windings is in the rotor and they provide a constant field, so that when the rotor is travelling at near speed of the revolving field, the two fields will lock together and the rotor will be pulled around at the same speed as the revolving field.

A synchronous electric motor is generally started the same way as an induction motor. The field circuit in the rotor is usually short-circuited or closed through an adequate resistance, to hold down the high induced voltage which would otherwise appear at the field terminals; and also to prevent a torque contribution by the induced field current. The pull-in torque developed by a particular motor depends to a considerable extent upon the resistance across the field circuit while it is being started.

When the rotor has accelerated to near synchronous speed, a D.C. current is introduced to the rotor winding. The DC current creates a unidirectional field, which interacts with the revolving field of the stator.

Application of the D.C. current at the proper moment can be done automatically by taking advantage of the motor characteristics. One of these characteristics is that as the motor nears synchronous speeds, the frequency in the rotor circuit approaches zero. The second characteristic is that as the rotor "slips" with respect to the revolving field there are corresponding pulsations in the line current. These conditions can be detected by either a frequency sensitive relay in the field circuit or by a special relay in the line, and the relays can then initiate the switching on of the D.C. field current.

Large synchronous motors are customarily not connected on line, but rather are provided with starting devices such as starter motors coupled to the main machine or separate starting machine sets. Such devices are expensive, however, and require additional maintenance.

SUMMARY OF INVENTION

It is therefore an object of the invention to provide a synchronous motor which is directly coupled to a high-speed work-performing machine for high power consumption and which is capable, while self starting asynchronously, of overcoming the counter torque of the work performing machine safely and without thermal overloading or heavy voltage dips on the line.

It is another object of this invention to provide a synchronous motor to be coupled with a machine of high power consumption that can be connected directly to the line with a low terminal voltage and which does not require separate starting mechanisms which are expensive and require additional maintenance.

Accordingly there is disclosed a synchronous electric motor of turbine type construction with a massive drum rotor of solid magnetic material containing iron, such as iron or iron alloy, e.g., formed special steel, and which has a necked section. Field windings are interiorly disposed in slots which are longitudinally disposed in the drum rotor, thus forming coils around the poles of the drum rotor. The coil heads of the field windings overlie the necked portion of the drum rotor. A cap is disposed over the coil heads and is insulated from the rotor to prevent electric conduction. Each slot containing the field windings is open towards the exterior surface of the cap and closed off by a non-magnetic slot closing wedge.

The slot closing wedges and caps are completely insulated from the rotor body as are the field windings so that no transition of the currents flowing in the iron to the slot closing wedges or caps is possible. Contact problems and thermal damage to the rotor resulting therefrom are therefore avoided.

It is advisable to make the insulation of the slot closing wedges and caps of highly heat-resistant material which is heat-resistant up to 300° C.

BRIEF DESCRIPTION OF THE DRAWINGS

FIG. 1 shows part of a radial cross section through a drum rotor of high mass of a synchronous electric motor, designed according to the present invention.

FIG. 2 shows part of a longitudinal cross section through the drum rotor in the area where the field winding slots are located.

DETAILED DESCRIPTION OF THE INVENTION

Figure 3:
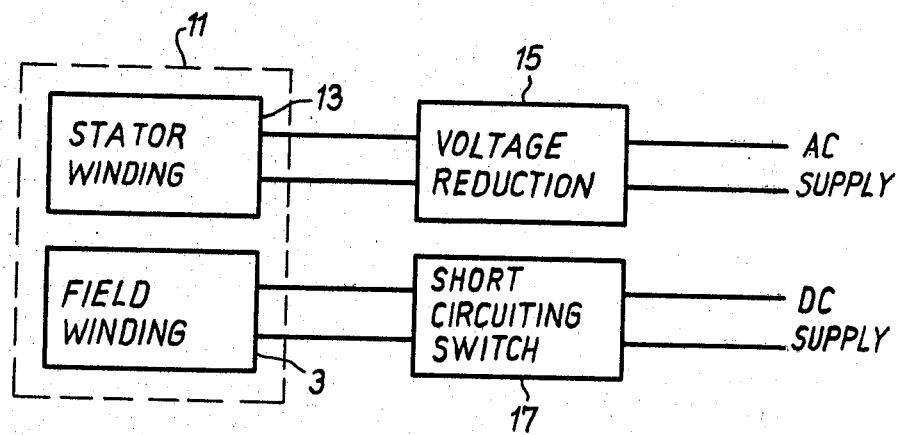
FIG. 3 is a block diagram of a system for operating a motor according to the present invention.

In the preferred embodiment, a drum rotor of high mass 1 is provided and is made of solid iron or iron alloy, e.g., forged special steel. The poles 2 of the drum rotor 1 are not slotted. Slots 5 are, however, formed between the poles 2. A plurality of insulated field windings 3 formed into coils are interiorly disposed in the slots 5 of the drum rotor 1. The slots 5 are open toward the rotor surface 4 and are closed off by non magnetic slot closing wedges 6. The drum rotor 1 has a section of reduced cross section for accommodating the coil heads of windings 3. A cap 11 is mounted and secured over the coil heads. For reasons of strength, the slot closing wedge 6 can advantageously consist of solid, non-magnetic steel. To improve heat removal during the normal operation of the synchronous motor, the conductors of the field winding 3 are provided with radially directed cooling canal 7 which also go through the slot closing wedge 6 and are supplied with cooling air by an axially extending cooling cannel 8 located underneath the slot 5.

In order to prevent conduction from the drum rotor 1 to the slot closing wedges 6, during the asynchronous start of the synchronous motor, the coils of the the field winding 3 and the slot closing wedges 6 are surrounded by insulation 9. The insulation 9 prevents splatter or local burn-in of the field winding 3 and the slot closing wedges 6. For the same reason, insulation 10 is provided under the cap 11 at the end faces of the drum rotor 1, which holds the field winding 3. The insulation 9 and 10 is of material of high thermal quality which can withstand temperatures of 200° to 300° C. which may occur during starting.

As shown by FIG. 3, such a synchronous motor 11 can have its stator 13 connected directly to the line with a low terminal voltage, for instance, of about one-half of the nominal voltage through voltage reduction means 15, such as a transformer, with the field winding 3 short circuited directly or with a resistor by short circuiting switch 17. Since there is no damper winding, the currents flow in the longitudinal direction in the solid iron of the drum 1 rotor during the start, and will flow under the field windings 3 or exciter slots 5. At high frequencies the flux, and thereby, the current, is displaced to the outer layer of the solid iron. This "skin-effect" phenomenon depends upon the slip, which is the difference between the speed of the rotating magnetic field and that of the rotor. The torque is therefore produced almost exclusively by high losses in a thin layer of the solid iron; and the torque is substantially larger over the entire range of speeds than the torque produced by comparable laminated rotors with starting cages. Therefore, starting is possible even with usual counter torques of the work-performing machine, at about one half of the nominal voltage.

With decreasing slip, an increasing part of the flux is linked with the field winding 3 which then furnishes a corresponding contribution to the torque, especially for developing the pull-out torque of the starting torque curve. The pull-out torque is the maximum sustained torque which the machine will develop at synchronous speed with rated voltage applied at rated frequencies and with normal excitation. The shape of the starting torque curve of the present invention, at near synchronous speeds shows a sufficient pull-in torque (i.e., maximum constant torque under which the motor will pull its connected inertia load into synchronism at rated voltage and frequency when its field excitation is applied), so that the synchronous motor synchronizes reliably.

During the starting phase the motor acts as an induction motor 11 and the field winding 3 is short circuited or closed through an adequate resistance by switch 17. This is done to hold down the high induced voltage which would otherwise appears at the field terminals and also eliminates the torque contribution by the induced field current. The switch is then opened and provided with a direct current in order to achieve synchronism. The AC voltage can then be increased to its normal value.

What is claimed is:

1. In a turbine type synchronous electric motor including a drum rotor of high mass made of solid magnetic material containing iron, having a plurality of unslotted poles, and a plurality of open radial slots between said poles; a plurality of field windings forming coils disposed in said open radial slots surrounding the poles with sections of reduced cross section at the ends of said ends to accommodate the coil heads of said coils; slot closing wedges radially outward of said winding closing said slots; and means for short circuiting said field winding during an asynchronous starting phase, the improvement comprising:

said slot closing wedges being made of solid, non-magnetic steel;
means for insulating said slot closing wedges from said drum rotor;
said field windings being the only windings on said rotor;
a cap surrounding said coil heads at each end; and
means for insulating said caps from said rotor.

2. The improvement according to claim 1 wherein said means for insulating said wedges and said means for insulating said caps comprise a highly heat-resistant material.

* * * * *